United States Patent [19]

Dula et al.

[11] Patent Number: 4,993,062
[45] Date of Patent: Feb. 12, 1991

[54] TELEPHONE CONTROL SYSTEM INCLUDING STORED BLOCKED AND ALLOWED TELEPHONE NUMBERS

[75] Inventors: Eric S. Dula, Ft. Lauderdale; Lawrence R. Hughes, Lauderdale Lakes, both of Fla.

[73] Assignee: Communications Equipment and Engineering Company, Plantation, Fla.

[21] Appl. No.: 309,340

[22] Filed: Feb. 10, 1989

[51] Int. Cl.⁵ .................. H04M 1/66; H04M 11/00
[52] U.S. Cl. ............................... 379/88; 379/98; 379/189; 379/190; 379/200
[58] Field of Search ............... 379/198, 196, 191, 190, 379/188, 8, 29, 1, 67, 200, 88, 98

[56] References Cited

U.S. PATENT DOCUMENTS

| 3,773,986 | 11/1973 | Tremblay | 379/8 |
|---|---|---|---|
| 3,786,196 | 1/1974 | Gresham | 379/189 |
| 4,656,651 | 4/1987 | Evans et al. | 379/1 |
| 4,661,971 | 4/1987 | Nemchek | 379/29 |
| 4,794,642 | 12/1988 | Arbabzadah et al. | 379/200 |
| 4,807,277 | 2/1989 | Perry | 379/102 |

FOREIGN PATENT DOCUMENTS

| 0145948 | 7/1986 | Japan | 379/8 |
|---|---|---|---|
| 0154250 | 7/1986 | Japan | 379/196 |
| WO87/00376 | 1/1987 | World Int. Prop. O. | 379/189 |

OTHER PUBLICATIONS

"Ericsson BCS 10", M. J. F. Janson, *Ericsson Review*, No. 3, 1985, pp. 144–152.

*Primary Examiner*—Thomas W. Brown
*Attorney, Agent, or Firm*—Mason, Kolehmainen, Rathburn & Wyss

[57] ABSTRACT

A telephone control system is provided for use between central office telephone equipment and a telephone line pair connected to a predefined telephone station. The telephone control system includes monitoring circuitry for monitoring the telephone line pair to identify predetermined signals. Control circuitry is responsive to the monitoring circuitry for selectively preventing or enabling a telephone call. Circuitry is provided for generating voice messages for transmission on the telephone line, such as to advise the user of time remaining for an established telephone call. Circuitry is provided for storing call information including a user identification number. Control circuitry is provided for detecting a first predetermined event, such as a predetermined time of day, and disconnecting the telephone line pair from the central office telephone equipment responsive to the detected first predetermined event. Control circuitry also detects a second predetermined event, such as a predetermined second time of day, and connects the telephone line pair to the central office telephone equipment responsive to the detected second predetermined event.

12 Claims, 4 Drawing Sheets

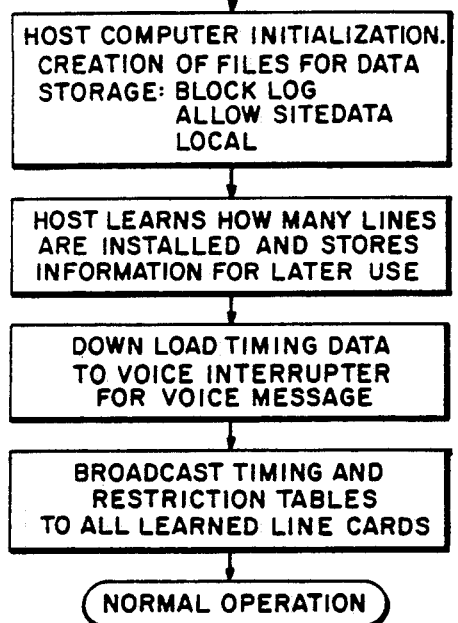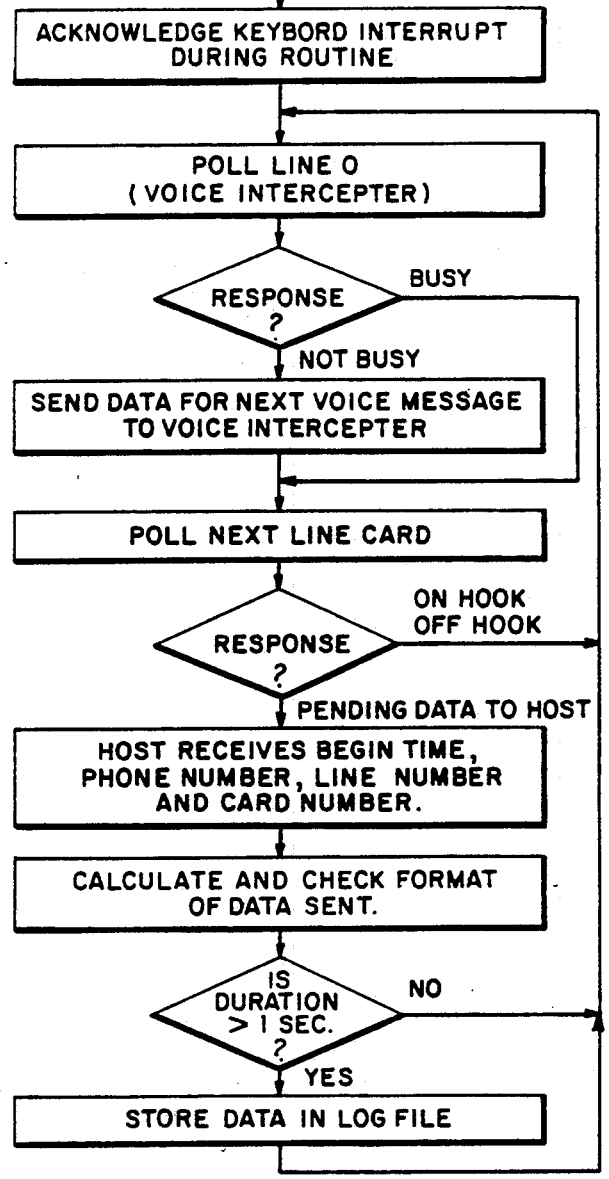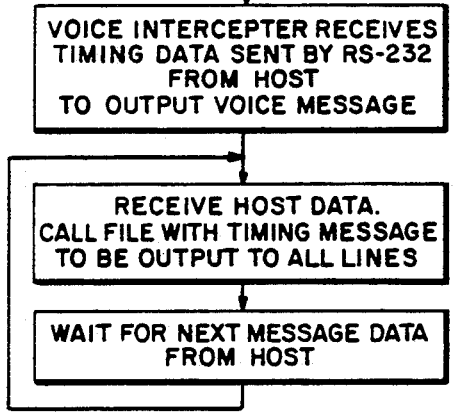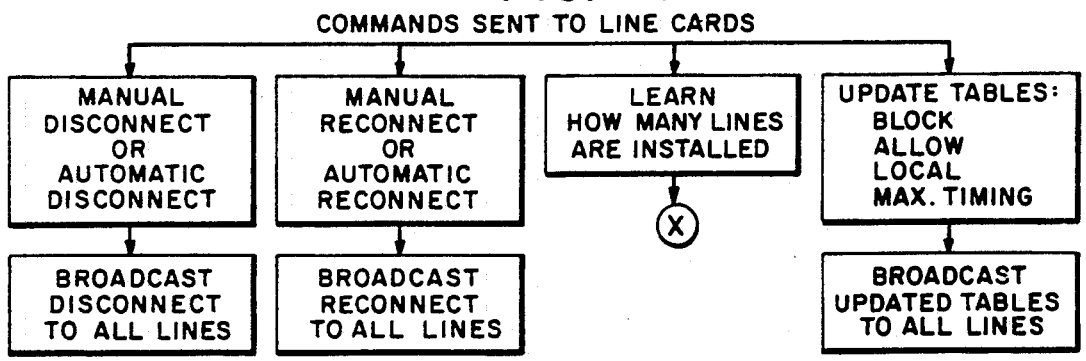

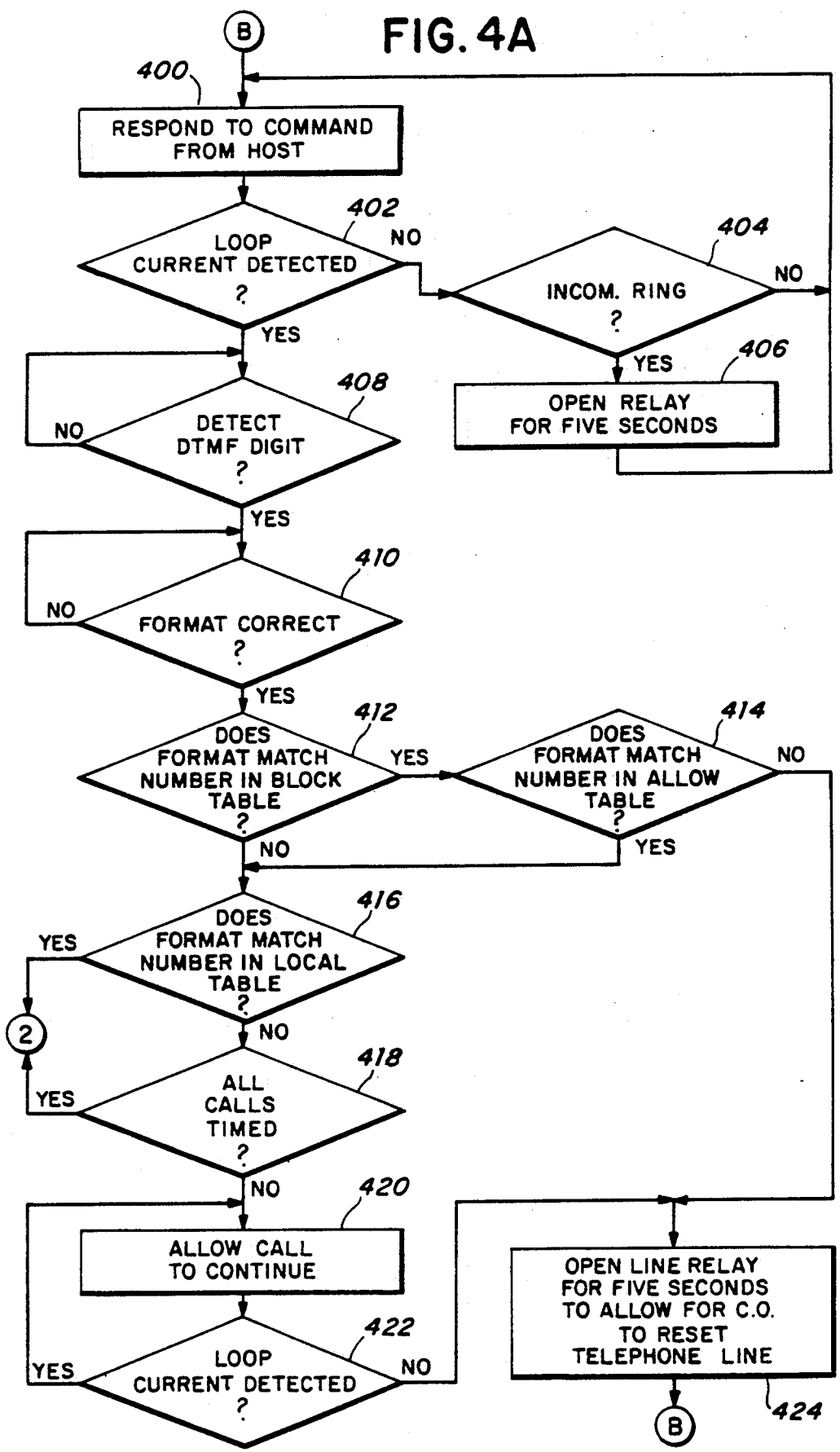

TELEPHONE CONTROL SYSTEM INCLUDING STORED BLOCKED AND ALLOWED TELEPHONE NUMBERS

FIELD OF THE INVENTION

The present invention relates generally to the field of telephone apparatus and more particularly to a telephone control system adapted for use in a prison telephone system.

DESCRIPTION OF THE PRIOR ART

Various arrangements are known in the art for providing restricted operations of individual telephone stations. Typically special central office equipment is required to provide various available controlled telephone station functions. Other functions not available under the supervision of central office equipment require manual monitoring and intervention.

It is desirable to provide a coinless telephone control system that eliminates many requirements for manual monitoring and intervention and provides features presently unavailable or only available with special central office equipment.

SUMMARY OF THE INVENTION

A principal object of the present invention is to provide an improved telephone control system. Other important objects of the present invention are to provide an improved telephone control system for use between central office telephone equipment and a telephone line pair connected to predefined telephone station; to provide such a control system capable of disconnecting and connecting multiple telephone line pairs to the central office telephone equipment at predetermined stored times and in response to manual user-operator selections; to provide such a control system capable of monitoring predetermined signals on the telephone line pair and for selectively preventing or enabling a telephone call responsive to the detected line signals.

In brief, the objects and advantages of the present invention are achieved by a telephone control system for use between central office telephone equipment and a telephone line pair connected to a predefined telephone station. The telephone control system includes monitoring circuitry for monitoring the telephone line pair to identify predetermined signals. Control circuitry is responsive to the monitoring circuitry for selectively preventing or enabling a telephone call. Circuitry is provided for generating voice messages for transmission on the telephone line, such as to advise the user of time remaining for an established telephone call and for storing call information including a user identification number. Control circuitry detects a first predetermined event, such as a predetermined time of day, and disconnects the telephone line pair from the central office telephone equipment responsive to the detected first predetermined event. The control circuitry detects a second predetermined event, such as a predetermined second time of day, and connects the telephone line pair to the central office telephone equipment responsive to the detected first predetermined event.

BRIEF DESCRIPTION OF THE DRAWINGS

The present invention together with the above and other objects and advantages may best be understood from the following detailed description of the embodiment of the invention illustrated in the drawings, wherein:

FIG. 2A-2B are flow charts illustrating the logical steps performed by a host computer of the telephone control system of FIG. 1;

FIG. 3A-3B are flow charts illustrating the logical steps performed by a voice communications control microcomputer of the telephone control system of FIG. 1; and FIG. 4A-4B are flow charts illustrating the logical steps performed by a line control microcomputer of the telephone control system of FIG. 1.

DETAILED DESCRIPTION OF THE PREFERRED EMBODIMENT

Figure 1:
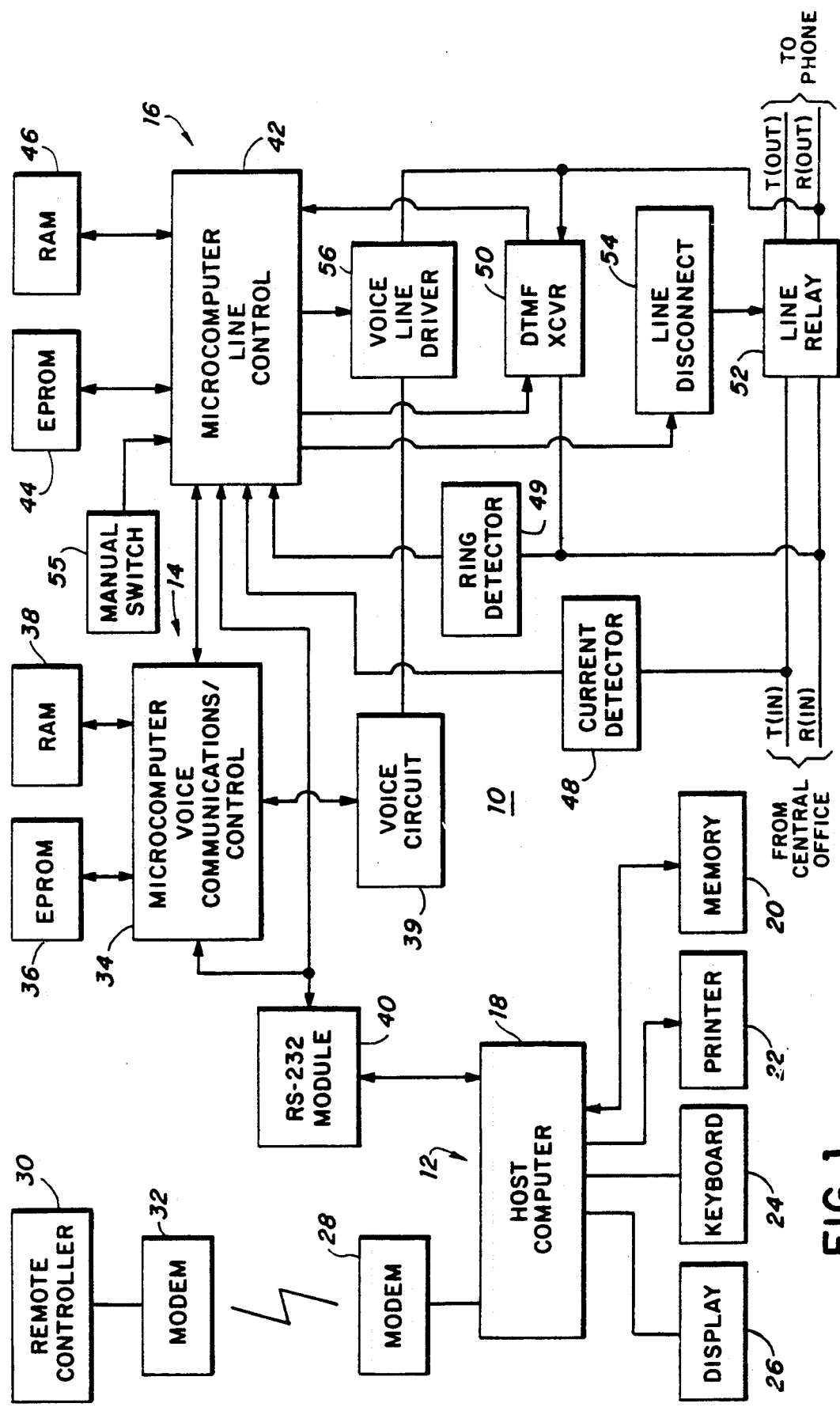
FIG. 1 is a block diagram representation of the telephone control system of the present invention.

Referring now to the drawings, in FIG. 1 there is illustrated a block diagram representation of the telephone control system according to the present invention generally designated by the reference character 10. The telephone control system 10 is used between central office telephone equipment and a plurality of individual telephone stations. The telephone control system 10 is adapted for controlling multiple individual telephone stations that can be located at various sites, for example, within a prison or similar such institution.

In general, the telephone control system 10 is capable of detecting the telephone numbers dialed and establishing calls to predetermined allowed numbers, detecting and storing call information with user identification data and automatically disconnecting a call after a preset call time duration. Another feature of the telephone control system 10 is that the multiple telephone stations can be both automatically disconnected from and connected to the central office telephone equipment at predetermined times or in response to a user-operator disconnect or connect selection. Voice messages are provided to advise or prompt the user.

Among its major components, the telephone control system 10 includes a host computer system designated generally by the reference number 12, a microcomputer voice control/communications system designated generally by the reference character 14 and a plurality of microcomputer line control systems 16 (one shown). Each of the microcomputer line control systems 16 is connected between an associated line pair for one of the multiple telephone stations and the central office telephone equipment.

The host computer system includes a personal computer 18, such as an IBM AT personal computer, however, various other commercially available computers having standard capabilities can be used. The host computer system includes an associated memory 20 for storing system control parameter data and operational data. An internal hard memory drive having for example, a capacity of 30M bytes can be used for the memory 20. Telephone call information is stored in a LOG file within the memory 20 together with various other data and system control files, such as an ALLOW file providing a table of allowed telephone numbers together with corresponding users' identification numbers and similarly a BLOCK file providing a table of blocked or prohibited telephone numbers stored together with corresponding users' identification numbers. A LOCAL file is stored within the memory 20 including the area code and exchanges for permitted local area calls together with any preset time limitation for the local area calls.

A printer 22 is coupled to the host computer 18 for printing various operator-user selected reports extracted from the data files stored in memory 20. A keyboard 24 and display 26 are coupled to the computer 18 to facilitate receiving operator-user requests, for example, requests for a selected report and for updating system program control data, such as, for changing the preset maximum call time value and for adding or deleting an allowed telephone number with a particular user's identification number within the ALLOW file. A modem 28 is connected to the host computer 18 to enable remote programming changes to be implemented in the system 10 from a remote controller 30 that also includes an associated modem 32.

The microcomputer voice communications control system 14 includes a microcomputer 34, such as a Motorola 68HC11, and associated memory devices such an electronically programmable read only memory (EPROM) 36 for storing a control and communications program and program control parameter data and a random access memory (RAM) 38 for storing operating data and program parameter data. A voice circuit 39 is included with the system 14 for generating a plurality of voice messages under the program control of the microcomputer 34 in conjunction with the host computer 18 and the microcomputer line control systems 16. An RS-232 communications module 40 connects the host computer 18 with the microcomputer 34 and a microcomputer 42 included in each of the microcomputer line control systems 16.

An identical microcomputer device as used for the microcomputer 34 can be used for the line control microcomputer 42, however various other commercially available microcomputers having standard capabilities can be used. The line control system 16 includes memory devices associated with the microcomputer 42 of an EPROM 44 that stores the line control program and program parameter data, such as allowed and blocked telephone numbers and a RAM 46 that stores current operating data and line program parameter data.

The microcomputer line control system 16 includes multiple sensors for monitoring the associated telephone line pair. A current detector 48 is coupled to the incoming tip line T(IN) from the central office and provides a detected loop current output signal to the microcomputer 42. A ring detector 49 is coupled to the incoming ring line R(IN) from the central office and provides a detected ring output signal to the microcomputer 42. A multifrequency tone transceiver (DTMF XCVR) 50 is coupled between the outgoing ring line R(OUT) to the telephone station and a line relay 52 and to the microcomputer 42 for receiving generated multifrequency tones or dial pulses from the telephone station that are applied to the microcomputer 42 and for generating multifrequency tones applied to the incoming ring line R(IN) for transmission to the central office under the program control of microcomputer 42.

A telephone disconnect circuit 54 is coupled between the line relay 52 and the microcomputer 42 for operating the relay under the program control of the microcomputer 42 to both connect and disconnect the telephone line pair T(OUT), R(OUT) from the central office telephone equipment. A manually operable switch 55 is coupled to the microcomputer 42 for providing user-operator disconnect and connect selections. Switch 55 is moveable between a first and second position by the user-operator for alternatively providing a high or low input signal to the microcomputer 42 utilized by the microcomputer 42 for providing predetermined commands for disconnecting or connecting the telephone line pair with the central office telephone equipment. A voice line driver circuit 56 is connected to the microcomputer 42, the voice circuit 39 and the outgoing ring line R(OUT) for transmitting voice messages under the program control of microcomputer 42.

The operation of the telephone control system 10 may best be understood with reference to the flow charts.

Referring now to FIG. 2A, there is shown a flow chart illustrating the logical steps performed by the host computer 18. As shown, the sequential operations for the host computer begin after the host computer 18 performs a routine to learn the number of lines connected to the telephone control system 10. This step prior to entry points A, B, and C of FIG. 2A is illustrated and described below with respect to FIG. 3A. The sequential operations by the host computer 18 begin with an initialization routine and the creation of files for data storage such as the BLOCK, ALLOW, LOCAL and LOG files described above and a SITEDATA file for storing general data for the control system 10. Then the host computer 18 learns the number of telephone lines installed with the control system 10 and stores the identified telephone line information for later use. Next the host computer transfers timing data to the control system 14 to be used for generating and sending voice messages. Next the host computer transmits timing and restriction tables to all the identified line cards. Then normal sequential operations continue as illustrated by the flow charts beginning with an entry point of A, B, and C corresponding to FIG. 3B, 4A and 2B, respectively.

Referring now to FIG. 2B, the sequential normal operation of the host computer 18 continues following entry point C. As illustrated, an acknowledged keyboard interrupt during a routine is first performed. Then the host computer 18 polls the microcomputer 34 in order to send a message to the voice interceptor. When a busy response is received by the host computer 18, the host computer then polls the next sequential line card. Otherwise, if a not busy response is received by the host computer from the microcomputer 34 in response to the first poll, then the host computer sends data for the next voice message to the voice interceptor. After the next voice data message is sent, then the next line card is polled.

If the response from the polled line card is on hook or off hook, then the host computer 18 again polls the microcomputer 34 for sending the next voice message to the voice interceptor. Otherwise when a pending data response is received by the host computer from the polled next line card, then the host computer 18 receives the pending data from the polled line card. The pending data may include a beginning time for a particular telephone call, the phone number called together with a user identification number or card number and the line number. Next the host computer performs a calculation and checks the format of the received data sent by the particular polled line card. If the duration of the call is greater than one second then the host computer 18 stores the data in the LOG file within memory 20. Otherwise if the call duration is less than one second the sequential operations return as shown with polling the microcomputer 34 for sending the next voice message to the voice interceptor.

Referring now to FIG. 3A, there is shown a flow chart illustrating the commands sent by the microcomputer 34 to the line controls 16. At start up, the microcomputer 34 polls each of the line control microcomputers 42 to determine how many lines are installed. The sequential operations then continue at the entry point X of FIG. 2A referred to above with respect to the sequential operations of the host computer 18. In response to a manual disconnect selection provided by a user-operator such as a guard or at a predetermined set time for automatic disconnect, the voice microcomputer 34 broadcasts a predetermined disconnect command to all of the line microcomputers 42 for disconnecting all of the telephone line pairs. Each line disconnect circuit 54 is then enabled to provide a disconnect control signal to the line relay 52. Similarly in response to a manual connect or automatic connect at a predetermined set time, the microcomputer 34 broadcasts a connect signal whereby all of the lines are reconnected for normal operation that is accomplished by the microcomputer 42 providing a disable signal to the line disconnect circuit 54. At start up of the system 10 and following any user/operator changes in the stored tables within memory 20, the microcomputer 34 broadcasts all updated tables such as block, allow, local, max timing to the line microcomputer 42.

Referring now to FIG. 3B, there is shown the logical steps performed by the microcomputer 34 following the entry point A from FIG. 2A described above with respect to the operations of the host computer 18. The sequential operations of the microcomputer 34 start with the voice intercepter receiving timing data sent by the host computer 18 via the RS-232 module 40 to output the particular voice message. The next illustrated operation of the microcomputer 34 is to receive host data, then to call the file storing the timing message to be output to all lines. Then the microcomputer 34 waits for the next message data from the host computer 18.

Referring to FIG. 4A, there is shown a flow chart illustrating the logical steps performed by each of the line microcomputers 42 following the entry point B from FIG. 2A. During normal operation, the line microcomputers 42 respond to any command received from the host computer 18 (indicated at block 400). The microcomputer 42 monitors the signal input from the current detector 48 to detect loop current (indicated at block 402). When loop current is not detected and an incoming ring signal is detected (indicated at block 404) the microcomputer 42 provides a control signal for opening the line relay 52 for the corresponding telephone line pair (indicated at block 406). Otherwise, when neither loop current or ring signal is detected the sequential operations return to the entry point B to respond to commands received from the host computer 18.

Otherwise, when a loop current signal is received (indicated at block 402) from the current detector 48 for the monitored line, the microcomputer 42 monitors the signal output from the DTMF transceiver (indicated at block 408). The received multifrequency signal output is checked to determine if the format is correct (indicated at block 410). When the line computer 42 determines that the format of the received signal is correct, then the line computer 42 compares the format signal to determine if it matches a number in the block table (indicated at block 412). When a match is identified, then the microcomputer 42 compares the format signal with numbers in the allow table (indicated at block 414).

When a match is found with a number stored in the allow table then a format comparison is made with the numbers stored in the local table (indicated at block 416). If a match is not found with the local table data, then the microcomputer 42 determines if all calls are to be timed (indicated at block 418). If determined that only local calls are timed, then the call is allowed to continue (indicated at block 420). Then a check is made of the loop current signal from detector 48 (indicated at block 422) and if loop current is not detected the microcomputer 42 generates a control signal to open the line relay 52 for a predetermined number of seconds (indicated at block 424) to allow the central office to reset the telephone line. Then the sequential operations return to entry point B at the top of FIG. 4A.

Figure 4B:
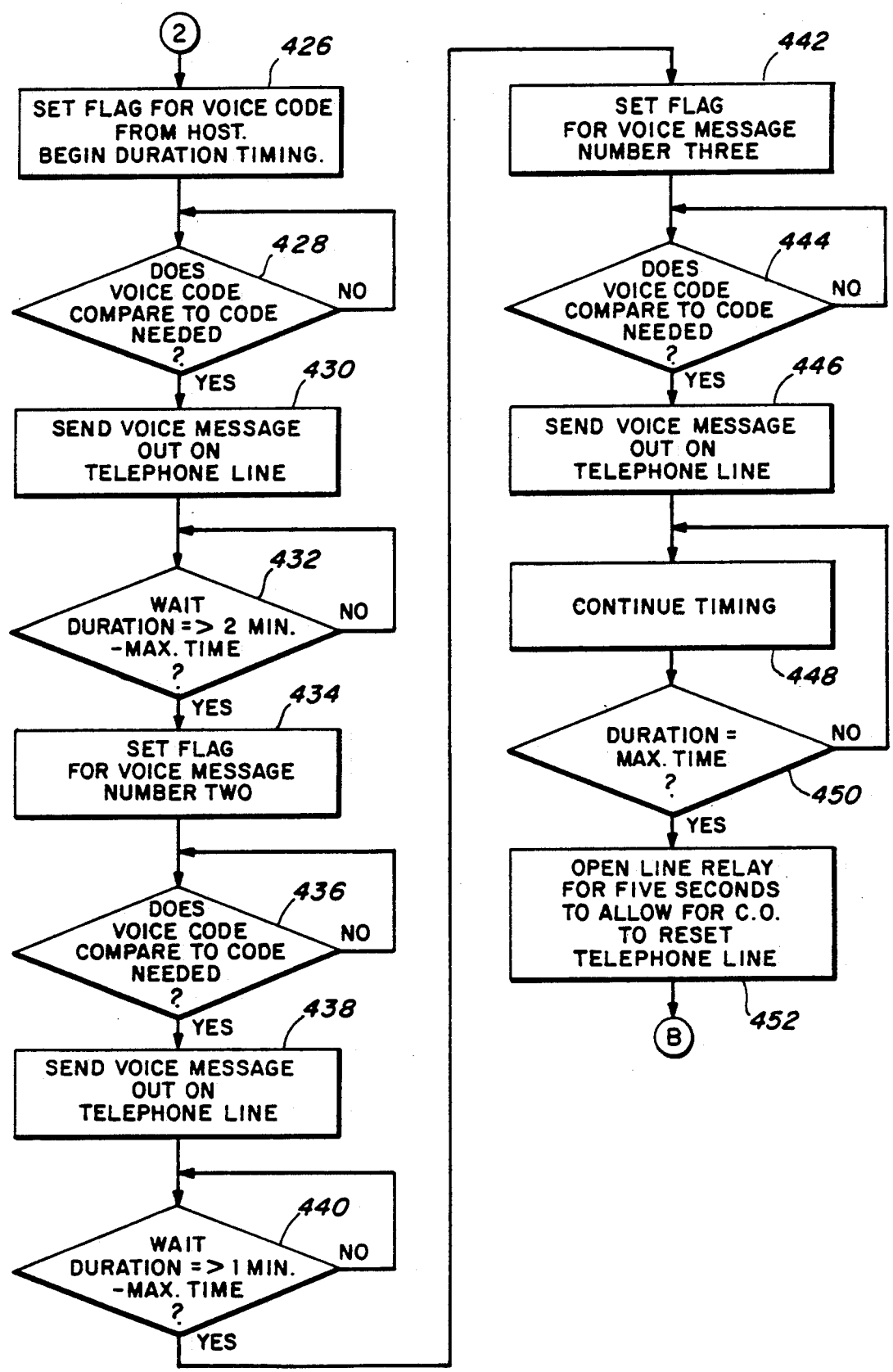

Otherwise, when either the signal format matches a number stored within the local table or it is determined that all calls are to be timed, then the sequential operations continue at the entry point 2 of FIG. 4B.

The sequential operations continue as shown in FIG. 4B by the microcomputer 42 setting a flag for voice code from the host computer 18 and starting timing of the time duration for the call (indicated at block 426). The line microcomputer 42 compares the received voice code, to the code needed for sending a voice message out on the line (indicated at block 428). When a match is found, the voice message is sent ,out on the telephone line via the voice circuit 39 and the voice line driver 56 (indicated at block 430). After a predetermined time (indicated at block 432), such as two minutes, a flag is set for the next voice message (indicated at block 434), for example voice message number 2. Again the microcomputer 42 compares the voice code received to the code needed (indicated at block 436). When a correct code is identified, the microcomputer 42 sends a voice message out on the telephone line (indicated at block 438). A next predetermined time interval such as, for example one minute, is then identified (indicated at block 440).

A flag is then set for the next voice message number 3 (indicated at block 442). The received voice code for message number 3 is compared with the needed code by microcomputer 42 and when identified, as correct (indicated at block 444), the next voice, message is sent out to the telephone line (indicated at block 446). Timing is continued (indicated at block 448) until a maximum maximum predetermined time is identified (indicated at block 450), such as a 4 minute time interval from the beginning time of the telephone call. Then the microcomputer 42 provides a signal to open the line relay 52 to allow the central office to reset the particular telephone line (indicated at block 452).

While the invention has been described with reference to details of the illustrated embodiment, these details are not intended to limit the scope of the invention as defined in the appended claims.

We claim:

1. A telephone control system for use between central office telephone equipment and a telephone line pair connected to a predefined telephone station comprising:
monitoring means coupled to said telephone line pair for monitoring said telephone line pair to identify predetermined signals, said monitoring means including means for detecting loop current and means for detecting dialed signals;

means for storing a plurality of both blocked and allowed telephone numbers;

comparator means coupled to said means for detecting dialed signals and said means for storing and responsive to said means for detecting dialed signals for comparing detected signals with both blocked and allowed numbers stored by said means for storing;

means coupled to said comparator means and said telephone line pair and responsive to said comparator means for selectively preventing or enabling a telephone call;

first event detecting means for detecting a first predetermined event;

means coupled to said first event detecting means and said telephone line pair and responsive to said first event detecting means for disconnecting said telephone line pair from the central office telephone equipment;

second event detecting means for detecting a second predetermined event;

means coupled to said second event detecting means and said telephone line pair and responsive to said second event detecting means for connecting said telephone line pair to the central office telephone equipment;

voice generating means for generating a plurality of predetermined voice messages and line control means associated with said telephone line pair and coupled to said voice generating means for selecting one of the predetermined voice messages for generation and for transmitting said selected voice message on said associated telephone line pair.

2. A telephone control system as recited in claim 1 further comprising call duration value storage means for storing a predetermined call duration value; timing means responsive to an enabled telephone call for identifying a call duration value; call duration value comparator means for comparing said predetermined call duration value stored by said call duration value storage means and an identified call duration value identified by said timing means; and means coupled to said call duration value comparator means and said telephone line pair and responsive to said call duration value comparator means for disconnecting a telephone call.

3. A telephone control system as recited in claim 1 wherein said first event detecting means for detecting a first predetermined event includes first time value storage means for storing a first predetermined time value and means for identifying a time of day corresponding to said first predetermined time value stored by said first time value storage means.

4. A telephone control system as recited in claim 1 wherein said first event detecting means for detecting a first predetermined event includes switch means for manual operation between a first and second position and means coupled to said switch means for identifying an operation of said switch means to said first position.

5. A telephone control system as recited in claim 3 wherein said second event detecting means for detecting a second predetermined event includes second time value storage means for storing a second predetermined time value and means for identifying a predetermined time of day corresponding to said second predetermine time value stored by said second time value storage means.

6. A telephone control system as recited in claim 1 wherein said second event detecting means for detecting a second predetermined event includes switch means for manual operation between a first and second position means coupled to said switch means for identifying an operation of said switch means to said second position.

7. A telephone control system as recited in claim 1 further comprising program control means for receiving user input selections and means coupled to said program control means for updating stored system control parameter data responsive to said program control means.

8. A telephone control system for use between central office telephone equipment and a telephone line pair connected to a predefined telephone station comprising:

first control means for generating a plurality of predetermined voice messages, said first control means including means for generating a plurality of predetermined commands;

second control means coupled to said first control means, said second control means operatively associated with said telephone line pair;

monitoring means coupled between said second control means and said associated line pair for identifying predetermined line signals, said monitoring means including means for detecting loop current and means for detecting dialed signals;

means for storing a plurality of both blocked and allowed telephone numbers;

comparator means coupled to said means for detecting dialed signals and said means for storing and responsive to said means for detecting dialed signals for comparing detected signals with both blocked and allowed numbers stored by said means for storing; and means coupled to said comparator means and said telephone line pair and responsive to said comparator means for selectively preventing or enabling a telephone call;

said second control means being responsive to a predefined first command received from said first control means for disconnecting said associated line pair from the central office telephone equipment and being responsive to a predefined second command from said first control means for connecting said associated line pair with the central office telephone equipment.

9. A telephone control system as recited in claim 8 wherein said second control means further comprises means for storing a predetermined call duration value; timing means responsive to an enabled telephone call for identifying a call time duration value; comparator means for comparing said predetermined call duration value stored by said means for storing and an identified call duration value identified by said timing means; and means coupled to said comparator means and said telephone line pair and responsive to said comparator means for disconnecting a telephone call.

10. A telephone control system as recited in claim 8 wherein said first control means includes first detecting means for detecting a first predetermined event; and wherein said means for generating a plurality of predetermined commands is responsive to said first detecting means for generating and sending said predefined first command to said second control means.

11. A telephone control system as recited in claim 10 wherein said first control means includes second detecting means for detecting a second predetermined event; and wherein said commands generating means is responsive to said second detecting means for generating and sending said predefined second command to said second control means.

12. A telephone control system for use between central office telephone equipment and a telephone line pair connected to a predefined telephone station comprising:
   a host computer including means for receiving and storing user selected control parameter data;
   first control means coupled to said host computer for generating a plurality of predetermined voice messages, said first control means including means for generating a plurality of predetermined commands;
   second control means coupled to said host computer and said first control means, said second control means operatively associated with said telephone line pair;
   monitoring means coupled between each of said second control means and said associated line pair for identifying predetermined line signals, said monitoring means including means for detecting loop current and means for detecting dialed signals;
   means for storing a plurality of both blocked and allowed telephone numbers;
   comparator means coupled to said means for detecting dialed signals and said means for storing and responsive to said means for detecting dialed signals for comparing detected signals with both blocked and allowed numbers stored by said means for storing; and
   means coupled to said comparator means and said telephone line pair and responsive to said comparator means for selectively preventing or enabling a telephone call;
   said second control means being responsive to a predefined first command received from said first control means for disconnecting said associated line pair from the central office telephone equipment and being responsive to a predefined second command from said first control means for connecting said associated line pair with the central office telephone equipment.

* * * * *

UNITED STATES PATENT AND TRADEMARK OFFICE
CERTIFICATE OF CORRECTION

PATENT NO. : 4,993,062
DATED : February 12, 1991
INVENTOR(S) : Dula et al.

It is certified that error appears in the above-identified patent and that said Letters Patent is hereby corrected as shown below:

Column 7, line 64, change "predetermine" to --predetermined--.

Column 8, line 3, after "position" insert --and--.

Signed and Sealed this

First Day of September, 1992

Attest:

DOUGLAS B. COMER

*Attesting Officer*  *Acting Commissioner of Patents and Trademarks*